UNITED STATES PATENT OFFICE.

JOSEPH HAY AMIES, OF PHILADELPHIA, PENNSYLVANIA, ASSIGNOR TO THE AMIES ASPHALT COMPANY, OF PHILADELPHIA, PENNSYLVANIA, A CORPORATION OF SOUTH DAKOTA.

COMPOSITION FOR BINDING, SURFACING, AND RESURFACING PURPOSES IN STREET AND ROAD BUILDING.

935,572.   Specification of Letters Patent.   Patented Sept. 28, 1909.

No Drawing.   Application filed January 26, 1909. Serial No. 474,316.

To all whom it may concern:

Be it known that I, JOSEPH HAY AMIES, a citizen of the United States, residing at Philadelphia, in the county of Philadelphia and State of Pennsylvania, have invented a certain new and useful Composition for Binding, Surfacing, and Resurfacing Purposes in Street and Road Building, of which the following is a specification.

The principal object of the present invention is to provide a composition suitable for surfacing and resurfacing purposes in the building of roads, streets and the like, said composition being of a character calculated to remain in a granular and friable condition until needed at which time it may be laid in a cold state in any temperature.

The process of making the composition may be described as follows:—I take hard asphalt or other bituminous elements; pine tar or other resinous pitch; distilled coal tar or other tar substances; or any suitable carbonaceous elements, and heat in a still together with a suitable flux any of the above elements, singly or combinedly to about 300 or 350 degrees F. The flux may consist of asphalt oil, creosote, resin oil, crude petroleum oil or any suitable fluxing element. I then pour this hot combination of matter upon duly graded crushed stone, grit, pebbles, sharp sand or gravel. These last mentioned materials may be used singly or combinedly and may be heated to a degree equal to that of the hot combination of matter aforesaid, that is to about 300 or 350 degrees F. I may however use cold instead of heated mineral matter, and when I so do I dampen the first mentioned or cold mineral matters with cold naphtha, gasolene or alcohol, singly or combinedly with crude oil or any other suitable light oil. I then mix them well together with the aforesaid heated combination of matter. The mixing may be done in any suitable manner and when it is completed I throw upon the mass a sufficient amount of sand, grit, very fine pebbles, gravel or the like, dampened with water, vapor or the like and this dampened material I then mix with and among the particles of the said composition. I then agitate the mass in any suitable manner for a sufficient time to allow the dampened sand coated composition to cool. The above mentioned sand, gravel, grit or like material may be used dry to separate the particles of the said composition, but it is not as effective as when dampened with water or the like. The purpose of the water, vapor or the like is to dampen the said particles to prevent the said particles from adhering. When the said composition has become sufficiently cold, the particles will not adhere until compressed thus securing a granular and friable bituminous composition suitable for surfacing and resurfacing purposes or in road and street building and like uses or to be used as a binder, in said construction.

What I claim is:

1. The method herein described of making a composition to be used in street and road building and like uses as a binder and for surfacing and resurfacing purposes which consists in coating mineral matter with crude naphtha, gasolene or alcohol with or without mixing them with other suitable light oils, then pouring thereon and mixing therewith hot asphalt cement and the like, then separating the particles of the mass by means of sand and the like, and then agitating the mass until cold to secure a granular and friable composition substantially as and for the purposes set forth.

2. The method herein described of making a composition to be used in street and road building and like uses, as a binder and for surfacing and resurfacing purposes which consists in coating hot mineral matter with hot asphalt cement and the like, then separating the particles of the mass with sand and the like, and then agitating the said particles until the whole has become sufficiently cold so as not to adhere until compressed.

3. The method herein described of making a composition to be used in street and road building and like uses, as a binder and for surfacing and resurfacing purposes which consists in coating mineral matter with crude naphtha, gasolene or alcohol with or without mixing them with other suitable light oils, then pouring thereon and mixing therewith hot asphalt cement and the like, then separating the particles of the mass by agitating the same until cold in order to secure a granular and friable composition substantially as described.

In testimony whereof I have hereunto signed my name.

JOSEPH HAY AMIES.

Witnesses:
  WILLIAM J. JACKSON,
  S. F. KOCH.